Patented July 24, 1951

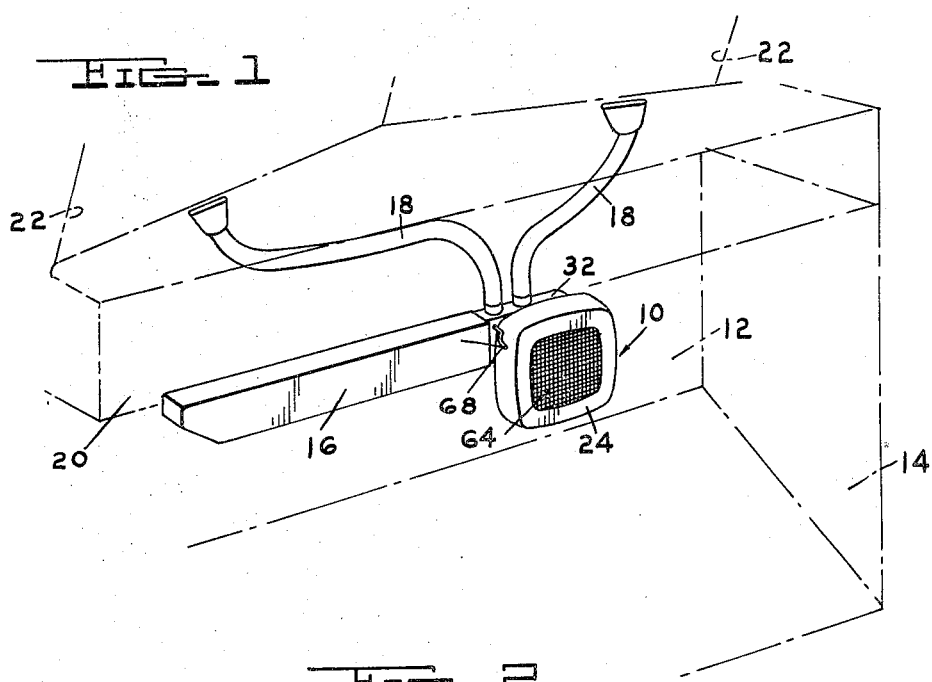
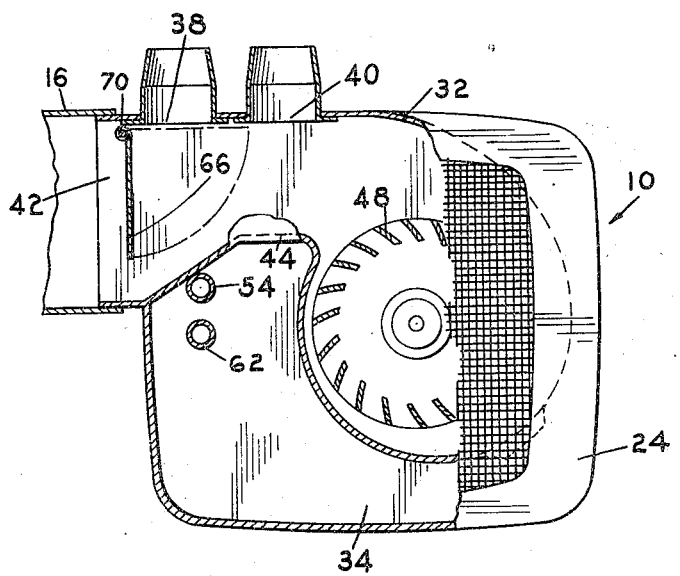

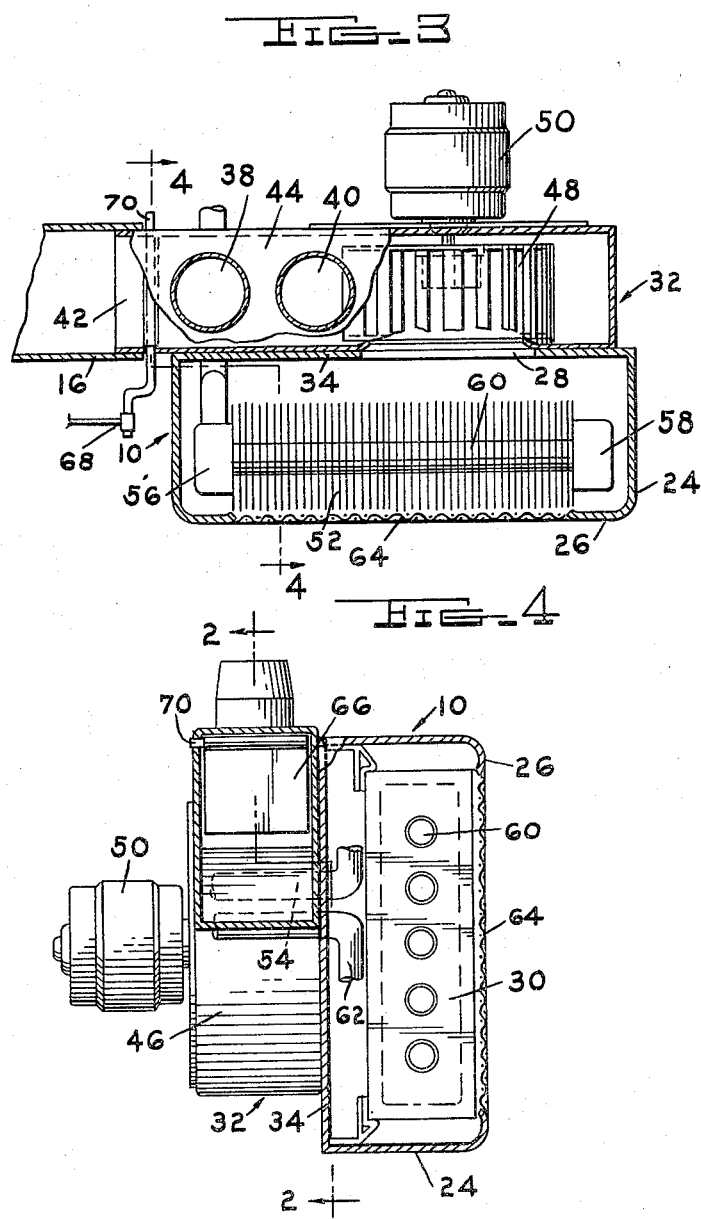

2,562,088

UNITED STATES PATENT OFFICE 2,562,088

HEATER

Ferd W. Fisher, Maple Heights, and George J. Basl, Independence, Ohio, assignors to Eaton Manufacturing Company, Cleveland, Ohio, a corporation of Ohio Application October 8, 1948, Serial No. 53,548

6 Claims. (Cl. 237—45)

This invention relates to heaters and more particularly to space heating for automotive vehicles.

Broadly the invention comprehends the provision of a heater for heating the passenger compartment of automotive vehicles wherein a single blower wheel effectively disposed within a blower scroll and having appropriate air outlet control means is effective to provide an ample supply of heated air for the passenger compartment and for windshield defrosting, as desired.

An object of the invention is the provision of a simple heater for automotive vehicles employing one air impelling means effective to supply a sufficient amount of air for proper passenger comfort and windshield defrosting.

Another object of the invention is the provision of an automotive vehicle space heater utilizing a single blower wheel-blower scroll structure having suitable outlet ducting and control means associated therewith for the ample and proper delivery of heated air to the vehicle passenger compartment or for combined passenger compartment, heating and windshield defrosting.

A further object of the invention is a provision of the heater having a blower wheel as the air impelling means therefore and wherein a simple flapper gate or valve is employed for the effective outlet control of air for delivery to either the passenger compartment alone or for partial delivery to both the passenger compartment and the windshield.

A still further object of the invention is the provision of a heater of the air circulating type for supplying heated air to the passenger compartment and to the windshield of the automotive vehicle comprising a housing having air inlet and outlet openings, a heater core disposed in the housing, a blower scroll mounted adjacent to the outlet for the housing, a blower wheel in said scroll, said scroll having an inlet adjacent to the housing outlet and including an outlet tube extending substantially and tangentially to the axis of the blower wheel, a pair of windshield defroster distributors extending from and substantially perpendicular to the scroll tube, a passenger compartment air distributor connected to the scroll tube outlet and an air controlled gate pivotal in the outlet from the scroll tube for controlling the amount of air to be delivered to either the defroster ducts or the passenger compartment air distributor.

Other objects and advantages of the invention will appear from the following description taken in connection with the drawings forming a part of the specification, and in which:

Fig. 1 is a perspective drawing of a heater constituting the invention, in assembled and installed relation upon the dashboard of an automotive vehicle inside of the passenger compartment;

Fig. 2 is a partially cross-sectionalized front plan view of the heater of Fig. 1 taken substantially along lines 2—2 of Fig. 4.

Fig. 3 is a partially cross-sectionalized top plan view of Fig. 1; and

Fig. 4 is a vertical cross-sectionalized view taken substantially along lines 4—4 of Fig. 3.

The present heater was devised for the purpose of providing a heater of the circulating type which is economical of construction and effective for the delivery of an ample supply of heated air for both windshield defrosting and passenger compartment heating. This heater is composed of two major members; a heater transfer core and a blower wheel, said core and wheel being appropriately mounted in suitable housing members providing for the entrance of air into the core and having the passage therefor through the core and wheel in an effective path for a substantial delivery to the passenger compartment and windshield of the vehicle in which the heater is installed, by suitable air distributor means. The blower wheel is rotatably mounted in a blower scroll of substantially conventional design wherein air is adapted to be drawn in through the central portion of the wheel and delivered radially outwardly along the scroll interior with a build-up in pressure until it is propelled tangentially through an outlet tube forming a part of the scroll. The air entering the blower is initially drawn through the heater core through inlet opening or openings in the core housing and is propelled through the scroll for delivery through the outlet means provided. A suitable manually operable valve or gate is mounted in the outlet of the scroll tube intermediate the outlet tubes to the windshield and outlet air distributor to the passenger compartment for controlling the air flow for either full delivery to the passenger compartment or for partial delivery to both the windshield and the passenger compartment. The windshield defroster outlet tubes are so positioned in the tangential outlet tube or channel forming a part of the blower scroll relative to the flow of air from the blower scroll such that upon fully opening the outlet to the passenger compartment distributor no air passes through the defroster tube due to the aspirating effect created by the velocity of the air exiting from the blower scroll along through its outlet tube. The control valve for full open passenger compartment delivery of air is positioned over the outlet connection to the defroster tube adjacent to the outlet connection with the passenger compartment distributor. By manually controlled movement of the valve across the opening to the passenger compartment distributor, a barrier to free air flow is set up in the scroll wheel tube thus providing for the forced circulated air up through the defroster tubes. Inasmuch as the valve is constructed so as to never completely obstruct the flow of air to the passenger compartment distributor a reasonable supply of air is delivered thereto for distribution to the passenger compartment. In this manner an effective windshield defrosting is accomplished without subtracting completely from the air flow to the passenger compartment.

Referring to the drawings for more specific details of the invention and particularly to Fig. 1 thereof, 10 represents generally a heater, constituting the basis of the invention, arranged upon the dash 12 of an automotive vehicle within the passenger compartment 14 thereof having associated therewith an air distributor 16 and a pair of defroster ducts or tubes 18 extending under the instrument panel 20 of the vehicle from the heater to the windshield 22 for the delivery of air thereto.

The heater 10 comprises a housing 24 having inlet and outlet openings 26 and 28 respectively disposed on opposite sides thereof, a heat transfer core 30 securely mounted in the housing, a blower scroll 32 mounted on the rear or outlet opening wall 34 of the housing having an inlet opening 36 registering substantially with the outlet opening 28 of the housing, defroster tube air outlet openings 38 and 40, and an outlet opening 42 arranged on the free end of a tube 44 forming an extension of the blower scroll arranged substantially tangentially to the axis of the main body 46 of the scroll, and a blower wheel 48 rotatably mounted in the scroll driven by an electric motor 50 secured to the exterior of the scroll. The tube 44 has an enlarged portion increasing in size from the exit of the wheel to the outlet opening 42, the purpose of which will hereinafter appear.

The free end of tube as shown by Fig. 1 is preferably connected to the air distributor so as to provide for air communication between the scroll and distributor but it is not essentially necessary in all instances that an air distributor be provided as the air exiting through outlet opening 42 can be allowed to pass directly into the passenger compartment without necessity of passage through any other air conveying means.

The heat transfer core 30 is of conventional design and provides air passages 52 therethrough extending in a direction between the inlet and outlet openings of the housing and is supplied heated liquid from a vehicle engine or the like. The liquid is supplied to the heater by way of conduit 54 for delivery through heater core headers 56 and 58 and liquid conveying tubes 60 and discharged through conduit 62 for return to the heat supply source. Although the heat transfer core, here shown, is of the general type deriving its supply of heated liquid from the cooling system of an engine of an automotive vehicle, any form of heat transfer mechanism might equally well be adapted to the heater.

The inlet opening 26 of the housing is covered over by a screen 64 through which air flows directly into and through the heat transfer core which is placed adjacent thereto.

The blower wheel is so positioned in the blower scroll so as to provide for the drawing in of air through the central portion thereof and delivery therefrom radially outwardly against and along the interior circumferential wall of the scroll so as to effect a build-up in pressure for the delivery of air at desired velocity and quantity through tube 44 to the distributor or defroster tubes 18.

The tube 44 flares outwardly from the blower at the discharge thereof to a point adjacent the outlet opening 42 so as to provide for a maximum flow of air for delivery to the air distributor and is controlled at or near outlet opening 42 by an air flow control gate or valve 66 mounted for pivotal actuation on tube 44. The gate 66 is adapted to be manually actuated at a remote point through the manipulation of an appropriate control, not shown, by way of Bowden wire connection 68 attached to the gate shaft 70.

The gate 66 is adapted to be moved between the full and dotted line showing of Fig. 2 for the controlled flow of air from the blower, either for partial delivery of air to both the air distributor and the defroster tubes when the gate is in full line position or for full delivery of the air to the air distributor when in dotted line position. It is further to be understood that the gate can be positioned as desired at any point between full line and dotted line positions to vary the proportionate flow to the respective air distributor and defroster tubes. It will be noted that when the gate is in dotted line position it only completely covers the outlet opening 38 but because of the arrangement of the openings 38 and 40 in tube 44 an aspirating effect is created thereby inhibiting the outward flow of air through defroster outlet opening 40.

When the gate 66 is placed in full line position of Fig. 2 it forms a barrier or resistance to the normal path of air flow through tube 44 to air distributor 16 thereby setting up a back pressure and forcing the air through the defroster openings for delivery to the windshield. Simultaneously with the delivery of air through the defroster outlet openings, a reduced quantity of air passes through opening 42 around the end of the gate and is discharged into the air distributor 16 for delivery to the passenger compartment.

While this invention has been described in connection with certain specific embodiments, the principle involved is susceptible of numerous other applications that will readily occur to persons skilled in the art. The invention, therefore, is limited only as indicated by the scope of the appended claims.

What we claim is:

1. A vehicle heater comprising a housing having oppositely disposed air inlet and outlet openings, a heat transfer core disposed in the housing having its air flow passages extending in parallel array between the inlet and outlet openings, a blower scroll mounted on the housing having an air inlet opening registering with the outlet opening in the housing, an air outlet opening at the scroll discharge end and a pair of side by side air outlet openings arranged for air flow perpendicularly to the other air outlet opening, a blower wheel disposed in the blower scroll with its axis of rotation lying in parallel relation to the air flow passages in the core and a manually actuated valve pivotal intermediate the single air outlet opening and the pair of air outlet openings in the scroll adapted to extend across but not completely cover the single air outlet opening in one position of operation and in its other furthest disposed position to cover one of the air openings of the pair of openings adjacent the single opening, said valve having a surface of less area than any cross sectional area of the discharge end of the scroll passing through the pivot point of the valve within which it is pivotal.

2. A vehicle heater comprising a housing having oppositely disposed air inlet and outlet openings, a heat transfer core disposed in the housing having its air flow passages extending between the inlet and outlet openings, a blower scroll mounted on the housing including a circular housing having an air inlet opening axially thereof registering with the housing air outlet opening and a tubular member integral with the circular housing and extending tangentially thereto having an air outlet opening at the free end thereof and a pair of air outlet openings arranged in the wall thereof perpendicular to the opening at the free end thereof, a blower wheel disposed in the scroll between the air inlet and outlet openings therein having its central portion registering with the air inlet opening in the scroll housing and with its axis of rotation lying parallel to the direct line of air flow through the core, an air distributor connected to the scroll in communication with the opening at the free end of the tubular extension of the scroll and a pair of defroster tubes connected to the scroll, one associated with each of the pair of openings in the wall of the tubular extension of the scroll and an air throttling valve pivotally mounted on the tubular extension at the top thereof for movement between the air outlet opening in the free end of the tubular extension and the pair of openings for inhibiting the flow of air through the pair of openings in one end position of movement while permitting free unobstructed flow through the air outlet opening in the free end of the tubular extension and effective when in its other extreme position permitting of a predetermined proportionate flow of air through all of the air outlet openings in the scroll extension, said valve being of such length that in its full arc of movement an opening is always present between the end thereof and the bottom of the tubular extension.

3. A vehicle heater comprising a housing having oppositely disposed air inlet and outlet openings, a heat exchanger disposed in the housing having air passages therethrough extending between the inlet and outlet openings, a blower scroll mounted on the housing having an air inlet opening registering with the outlet opening in the housing and an air outlet opening, a tubular member integral with the scroll having communication with the air outlet opening of the scroll extending tangentially therefrom having a passage way therethrough increasing in size substantially from the outlet of the scroll to the discharge therefrom and a pair of side by side openings lying in a plane substantially perpendicular to a plane of the discharge of the tubular member and substantially parallel to the tangential flow of air from the scroll and an air flow control gate pivotally mounted on the tubular member adjacently intermediate the discharge therefrom and one of the side by side outlet openings for movement in the passage in the tubular member, said gate having a shorter radius arm than the distance from its pivot point to any point on the opposite wall of the passage through the tubular member.

4. A vehicle heater according to claim 3 wherein the side by side openings in the tubular member lie in line intermediate the outlet from the scroll and the discharge from the tubular member in a plane forming a tangential continuation of the outer wall of the scroll.

5. A vehicle heater according to claim 4 wherein the side by side openings are in the roof of the tubular member and the bottom of the tubular member is angularly disposed to the tangential plane in which the roof thereof lies.

6. A vehicle heater according to claim 4 wherein the valve is of such length as to only extend from its pivot point adjacent the discharge from tubular opening across the opening of the side by side openings that lies adjacent thereto.

FERD W. FISHER.
GEORGE J. BASL.

REFERENCES CITED

The following references are of record in the file of this patent:

UNITED STATES PATENTS

| Number | Name | Date |
|---|---|---|
| 1,951,200 | Mullen et al. | Mar. 13, 1934 |
| 2,087,160 | Meyerhoefer | July 13, 1937 |
| 2,114,050 | Findley | Apr. 12, 1938 |
| 2,177,870 | Deitz | Oct. 31, 1939 |
| 2,225,071 | Meyerhoefer | Dec. 17, 1940 |
| 2,306,796 | Staley et al. | Dec. 29, 1942 |

FOREIGN PATENTS

| Number | Country | Date |
|---|---|---|
| 521,507 | Great Britain | May 23, 1940 |